(12) United States Patent
Wada et al.

(10) Patent No.: US 7,999,032 B2
(45) Date of Patent: Aug. 16, 2011

(54) METHACRYLIC RESIN COMPOSITION

(75) Inventors: Kazuhito Wada, Settsu (JP); Kimihide Nishimura, Takasago (JP); Norito Doi, Settsu (JP)

(73) Assignee: Kaneka Corporation, Osaka-shi, Osaka (JP)

( * ) Notice: Subject to any disclaimer, the term of this patent is extended or adjusted under 35 U.S.C. 154(b) by 61 days.

(21) Appl. No.: 11/994,746

(22) PCT Filed: Jul. 5, 2006

(86) PCT No.: PCT/JP2006/313390
§ 371 (c)(1),
(2), (4) Date: Jan. 4, 2008

(87) PCT Pub. No.: WO2007/004670
PCT Pub. Date: Jan. 11, 2007

(65) Prior Publication Data
US 2009/0012215 A1    Jan. 8, 2009

(30) Foreign Application Priority Data

Jul. 5, 2005   (JP) ................................. 2005-196193

(51) Int. Cl.
*C04B 35/634* (2006.01)

(52) U.S. Cl. ........ 524/561; 428/327; 428/515; 428/520; 524/556; 524/550; 525/221; 525/222; 525/227; 525/228

(58) Field of Classification Search .................. 525/198, 525/221, 222, 227, 228, 902; 428/327, 515, 428/520; 524/556, 560, 561
See application file for complete search history.

(56) References Cited

U.S. PATENT DOCUMENTS

| 6,387,497 | B1 * | 5/2002 | Nishida et al. ................. 428/403 |
| 6,476,148 | B1 | 11/2002 | Gross |
| 6,509,097 | B1 * | 1/2003 | Hatakeyama et al. ......... 428/412 |
| 2007/0212561 | A1 * | 9/2007 | Wada et al. .................... 428/522 |

FOREIGN PATENT DOCUMENTS

| CA | 2075216 | * | 3/1992 |
| DE | 4125857 | A1 | 2/1993 |
| EP | 0 131 468 | A2 | 1/1985 |
| EP | 1041095 | A1 | 10/2000 |
| JP | 60-38411 | A | 2/1985 |
| JP | 05-255447 | A | 10/1993 |
| JP | 8-319326 | A | 12/1996 |
| JP | 09-194542 | * | 7/1997 |
| JP | 9-194542 | A | 7/1997 |
| JP | 2004-105502 | * | 3/2004 |
| WO | WO 2005/095478 | * | 10/2005 |

OTHER PUBLICATIONS

International Search Report of PCT/JP2006/313390, date of mailing Sep. 12, 2006.
European Search Report dated Feb. 26, 2009, issued in corresponding European Patent Application No. 06767896.
Office Action issued on Nov. 18, 2009 in corresponding European Patent Application 06767896.1.

* cited by examiner

*Primary Examiner* — David Wu
*Assistant Examiner* — Robert Jones
(74) *Attorney, Agent, or Firm* — Westerman, Hattori, Daniels & Adrian, LLP

(57) ABSTRACT

An acrylic resin composition suitable for use as films excellent in transparency, weatherability, hardness, impact resistance, flex cracking resistance, and formability. The resin composition comprises an acrylic graft copolymer (A) including a rubbery acrylic ester polymer (A-a) and a methacrylic polymer (B) comprising 80 wt. % or more methyl methacrylate units, the acrylic resin composition having a specific value of reduced viscosity (0.2-0.8 dl/g), specific values of content (5-45 wt. %) and average particle diameter (50-200 nm) of the rubbery polymer (A-a), a specific relationship between the particle diameter and the crosslinking agent amount ($0.02d \leq w \leq 0.05d$; d, average particle diameter (nm); w, amount of crosslinking agent (wt. %)), and a specific value of the degree of grafting (50-250%). The resin composition contains an ultraviolet absorber incorporated therein through copolymerization.

11 Claims, No Drawings

METHACRYLIC RESIN COMPOSITION

TECHNICAL FIELD

The present invention relates to a methacrylic resin having ultraviolet ray shielding performance, and a film obtained by forming such resin into a shape.

BACKGROUND ART

In general, methacrylic resin compositions containing a cross linked elastic body excellent in transparency, weather resistance, hardness and impact resistance are used in the state that an ultraviolet absorber is mixed therewith. In particular, in the case of using a methacrylic resin composition as described above as a film, it is necessary to add an ultraviolet absorber thereto in a larger amount as the thickness of the film is made smaller.

For this reason, in the case of forming the composition into a film by extrusion molding or some other methods, there are caused problems, such as the clogging of a vent in the extruder, the adhesion of a gum to the T die, and the whitening of the cooling roll. Moreover, in the case that it is necessary that the ultraviolet absorber is added in a far larger amount, the roughening of the surface of the film, the bleeding-out thereof to the film surface, and other problems are caused.

Even if a great amount of an ultraviolet absorber can be added to a methacrylic resin composition, the absorbent partially volatilizes when the composition is subjected to extrusion molding since ordinary ultraviolet absorbers are generally poor in compatibility with methacrylic resin and have a low molecular weight. As a result, the film made of the composition cannot exert ultraviolet ray shielding performance. Furthermore, the ultraviolet absorber has a problem that the ultraviolet ray shielding effectiveness lowers with the passage of time since the ultraviolet absorber is dispersed from the methacrylic resin composition when the composition is used for a long term.

In order to solve these problems, known is generally a method of selecting a specific ultraviolet absorber and adding the absorber. However, according to the method of adding a specific ultraviolet absorber merely, from the resultant film, the added ultraviolet absorber bleeds out when the film is immersed in hot water or kept outdoors; thus, problems such that the ultraviolet rays shielding performance deteriorates and the film whitens, and other problems are unsolved.

On the other hand, suggested are methods of copolymerizing a specific monomer having ultraviolet absorbability with a methacrylic resin (Patent Documents 1 to 4). However, films obtained from these methods do not satisfy flex cracking resistance, flex whitening resistance, formability (formability into a thinner film), or others.

Patent Document 1: JP-A-60-38411
Patent Document 2: JP-A-05-255447
Patent Document 3: JP-A-09-194542
Patent Document 4: JP-A-08-319326

DISCLOSURE OF THE INVENTION

Problems to be Solved by the Invention

Consequently, desired is a methacrylic resin composition which can be formed into a film excellent in transparency, weather resistance, hardness, impact resistance, flex cracking (whitening) resistance, formability, and surface property.

Means for Solving the Problems

Thus, the present inventors have made eager investigations so as to find out that a film obtained from a methacrylic resin composition comprising an acrylic graft copolymer containing a specific acrylic ester rubbery polymer, which are copolymerized with a monomer having a specific chemical structural formula and exhibiting ultraviolet ray absorbability, and a methacrylic polymer is excellent in transparency, weather resistance, hardness and impact resistance, and is further excellent in flex cracking (whitening) resistance, and formability. As a result, the present invention has been made.

Accordingly, the present invention provides:

a methacrylic resin composition which is a methacrylic resin composition (C) comprising an acrylic graft copolymer (A) containing an acrylic ester rubbery polymer (A-a) and a methacrylic polymer (B) containing 80% or more by weight of a methacrylic ester, and satisfying the following:

(1) the content by percentage of the acrylic ester rubbery polymer (A-a) is from 5 to 45% by weight,
(2) the average particle diameter d of the acrylic ester rubbery polymer (A-a) is from 50 to 200 nm,
(3) the relationship between the average particle diameter d (nm) of the acrylic ester rubbery polymer (A-a) and the amount w (% by weight) of a crosslinking agent used for the acrylic ester rubbery polymer (A-a) satisfies the following formula:

$$0.02d \leq w \leq 0.05d,$$

(4) the graft ratio of the acrylic graft copolymer (A) is from 30 to 250%,
(5) the reduced viscosity of a fraction of the methacrylic resin composition (C) soluble in methyl ethyl ketone is from 0.2 to 0.8 dl/g, and
(6) an ultraviolet absorber represented by the following general formula (1) is copolymerized, in an amount of 0.01 to 30 parts by weight for 100 parts by weight of the acrylic graft copolymer (A), with the acrylic graft copolymer (A):

general formula (1)

[formula 1]

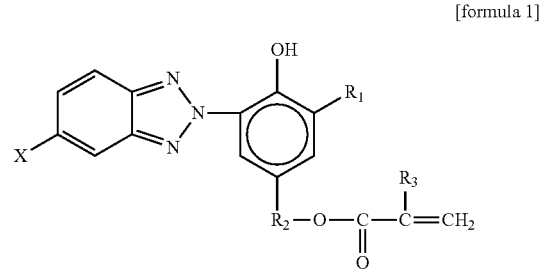

wherein X is H or a halogen, $R_1$ is H, methyl or a t-alkyl group which has 4 to 6 carbon atoms, $R_2$ is an alkylene group which is in a linear or branched chain form and has 2 to 10 carbon atoms, and $R_3$ is H or methyl.

In the above-mentioned methacrylic resin composition, the methacrylic polymer (B) may be a methacrylic polymer obtained by copolymerizing a monomer mixture which contains a methacrylic ester and an acrylic ester at the ratio by weight of the former to the latter of from 90/10 to 100/0, and contains the ultraviolet absorber represented by the general formula (1) in an amount of 0.01 to 30 parts by weight for 100 parts by weight of the methacrylic ester.

For example, it is preferred that the average particle diameter of the acrylic graft copolymer (A) is larger than the average particle diameter d of the acrylic ester rubbery polymer (A-a), and is further more than 100 nm and 400 nm or less.

Furthermore, the present invention provides a film obtained by forming the methacrylic resin composition of the present invention into a shape, and a laminate product comprising the film, in particular, the laminate product which is produced by injection molding.

EFFECTS OF THE INVENTION

According to the present invention, the copolymerization of a monomer exhibiting ultraviolet ray absorbability makes it possible to yield a methacrylic resin composition that can be formed into a film which overcomes the problems involved in the addition of an ultraviolet absorber and simultaneously gives excellent transparency, weather resistance, hardness and impact resistance as well as excellent flex cracking (whitening) resistance and formability.

Moreover, according to the present invention, the copolymerization of a monomer exhibiting ultraviolet ray absorbability makes it possible to yield a film which overcomes the problems involved in the addition of an ultraviolet absorber and simultaneously gives excellent transparency, weather resistance, hardness and impact resistance, which are properties necessary for films, as well as excellent flex cracking (whitening) resistance and formability.

Furthermore, according to the present invention, the use of the methacrylic resin composition of the present invention and the film of the present invention makes it possible to yield a film laminate product which is excellent in transparency, weather resistance, hardness and impact resistance and is also excellent in flex cracking (whitening) resistance and formability.

BEST MODE FOR CARRYING OUT THE INVENTION

Preferred embodiments of the present invention will be described in detail hereinafter.

The methacrylic resin composition (C) of the present invention is a composition comprising an acrylic graft copolymer (A) containing an acrylic ester rubbery polymer and a methacrylic polymer (B) containing 80% or more by weight of methacrylic ester.

The methacrylic resin composition (C) can be yielded by producing the acrylic graft copolymer (A) and the methacrylic polymer (B) independently of each other by polymerization, and then mixing these with each other. The methacrylic resin composition (C) can also be produced by the production of the acrylic graft copolymer (A) followed by the production of the methacrylic polymer (B) in the same reactor. In the former mixing method, the acrylic graft copolymer (A) and the methacrylic polymer (B) may be each independently in the form of, for example, latex, powder, beads, pellets or the like.

The acrylic graft copolymer (A) used in the present invention is a copolymer obtained by subjecting a (meth) acrylic ester monomer (A-b) to graft polymerization in the presence of an acrylic ester rubbery polymer (a crosslinked rubbery polymer made mainly of an acrylic ester) (A-a).

Herein, the (meth) acrylic ester monomer (A-b) means both of a (meth) acrylic ester monomer and the graft moieties of the acrylic graft copolymer (A) (moieties of the acrylic graft copolymer (A) except the acrylic ester rubbery polymer (A-a)). The wording "(meth) acrylic acid" means methacrylic acid and/or acrylic acid.

The methacrylic polymer (B) means any polymer that is not grafted when the (meth)acrylic ester monomer (A-b) is polymerized in the presence of the acrylic ester rubbery polymer (A-a), and may contain a polymer obtained when the (meth) acrylic ester monomer (A-b) is polymerized in the absence of the acrylic ester rubbery polymer (A-a).

The methacrylic resin composition (C) is a composition comprising the acrylic graft copolymer (A) and the methacrylic polymer (B).

The acrylic ester rubbery polymer (A-a) used in the present invention is a polymer obtained by polymerizing a monomer mixture (total amount: 100% by weight) containing 60 to 100% by weight of an acrylic ester and 0 to 40% by weight of a copolymerizable vinyl monomer, and a specific amount of a copolymerizable crosslinking agent. All of the monomers and the crosslinking agent may be mixed at a time and then the mixture may be used. Alternatively, the monomers and the crosslinking agent may be used at two or more stages while the composition of the monomers and the agent is varied (in other words, the monomers and the agent may be polymerized at two or more stages).

As the acrylic ester in the acrylic ester rubbery polymer (A-a), an acrylic ester having an alkyl group having 1 to 12 carbon atoms can be used from the viewpoint of polymerizability and costs. Specific examples thereof include methyl acrylate, ethyl acrylate, propyl acrylate, butyl acrylate, 2-ethylhexyl acrylate, and n-octyl acrylate. These monomers may be used alone or in combination of two or more thereof.

The amount of the acrylic ester in the acrylic ester rubbery polymer (A-a) is preferably from 60 to 100% by weight, more preferably from 70 to 100% by weight, most preferably from 80 to 100% by weight. If the amount of the acrylic ester is less than 60% by weight, the impact resistance is impaired and the elongation lowers at tensile fracture. Thus, the film tends to be easily cracked when the film is cut.

Examples of the other copolymerizable vinyl monomer in the acrylic ester rubbery polymer (A-a) include methacrylic esters, which preferably have an alkyl group having 1 to 12 carbon atoms and may be in a linear or branched form, such as methyl methacrylate, ethyl methacrylate, propyl methacrylate, n-butyl methacrylate, isobutyl methacrylate and t-butyl methacrylate, vinyl halides such as vinyl chloride and vinyl bromide, vinyl cyanides such as acrylonitrile and methacrylonitrile, vinyl esters such as vinyl formate, vinyl acetate and vinyl propionate, aromatic vinyl derivatives such as styrene, vinyl toluene and α-methylstyrene, vinylidene halides such as vinylidene chloride and vinylidene fluoride, acrylic acid and salts thereof such as acrylic acid, sodium acrylate and calcium acrylate, acrylic alkyl ester derivatives such as β-hydroxyethyl acrylate, dimethylaminoethyl acrylate, glycidyl acrylate, acrylamide and N-methylolacrylamide, methacrylic acid and salts thereof such as methacrylic acid, sodium methacrylate and calcium methacrylate, and methacrylic alkyl ester derivatives such as methacrylamide, β-hydroxyethyl methacrylate, dimethylaminoethyl methacrylate and glycidyl methacrylate. These monomers may be used in combination of two or more thereof. Out of these, methacrylic esters are particularly preferred from the viewpoint of weather resistance and transparency.

The other copolymerizable vinyl monomer in the acrylic ester rubbery polymer (A-a) is preferably from 0 to 40% by weight of the monomer mixture, more preferably from 0 to 30% by weight thereof, most preferably from 0 to 20% by weight thereof. If the amount of the other vinyl monomer is more than 40% by weight, the impact resistance is impaired and the elongation at tensile fracture lowers. Thus, when the film is cut, cracks may easily be generated therein.

The amount of the copolymerizable crosslinking agent in the acrylic ester rubbery polymer (A-a), together with the average particle diameter of the acrylic ester rubbery polymer, largely has an effect on the stress whitening, the elongation at tensile fracture or the transparency. Thus, it is important that the average particle diameter d (nm) of the acrylic ester rubbery polymer and the amount w (% by weight) of the crosslinking agent satisfy the following formula:

$$0.02d \leq w \leq 0.05d$$

The average particle diameter of the acrylic ester rubbery polymer (A-a) is from 50 to 200 nm, preferably from 50 to 160 nm, more preferably from 50 to 120 nm, most preferably from 60 to 120 nm. If the average particle diameter of the acrylic ester rubbery polymer is less than 50 nm, the impact resistance and so on are impaired and the elongation at tensile fracture lowers, thus, when the film is cut, the film tends to be easily cracked. If the average particle diameter is more than 200 nm, stress whitening is generated so that the transparency is impaired. Additionally, after the composition is subjected to vacuum molding, the transparency tends to be impaired.

The amount of the crosslinking agent is preferably in the range represented by the above-mentioned formula. The amount more preferably satisfies the following formula: $0.023d \leq w \leq 0.047d$, and even more preferably satisfies the following formula: $0.025d \leq w \leq 0.045d$. If the amount w of the crosslinking agent is less than 0.02d or more than 0.05d, stress whitening is generated and the impact resistance or the transparency are impaired. Furthermore, the elongation at tensile fracture lowers. Thus, when the film is cut, the film tends to be easily cracked and the formability of the film tends to be impaired.

The crosslinking agent used for this purpose may be an agent that is ordinarily used. For example, the following may be used: allyl methacrylate, allyl acrylate, triallyl cyanurate, triallyl isocyanurate, diallyl phthalate, diallyl malate, divinyl adipate, divinylbenzene, ethylene glycol dimethacrylate, diethylene glycol dimethacrylate, triethylene glycol dimethacrylate, trimethylolpropane trimethacrylate, tetramethylolmethane tetramethacrylate, and dipropylene glycol dimethacrylate; and acrylates thereof. These crosslinking agents may be used alone or in combination of two or more thereof.

As described above, the acrylic graft copolymer (A) used in the present invention is a copolymer obtained by polymerizing a(meth) acrylic ester monomer(A-b) in the presence of the acrylic ester rubbery polymer (A-a). Preferably, the acrylic graft copolymer (A) is obtained by polymerizing 95 to 25 parts by weight of the (meth) acrylic ester monomer (A-b), at one or more stages in the presence of 5 to 75 parts by weight of the acrylic ester rubbery polymer (A-a).

The amount of the methacrylic ester in the graft copolymerization composition (monomer mixture) (A-b) is preferably 80% or more by weight, more preferably 85% or more by weight, even more preferably 90% by weight. If the amount of the methacrylic ester is less than 80% by weight, the hardness and the rigidity of the resultant film tend to lower. The monomer used in the graft copolymerization is a methacrylic ester or an acrylic ester, and specific examples thereof include the monomers listed up and used for the acrylic ester rubbery polymer (A-a).

At this time, the graft copolymerization composition (monomer mixture) (A-b) is not partially grafted to the acrylic ester rubbery polymer (A-a) so as to generate a component that is non-grafted polymer (a free polymer). This component (the free polymer) constitutes a part or the whole of the methacrylic polymer (B).

A part ((A-a) and the grafted (A-b)) of the acrylic graft copolymer (A) becomes insoluble in methyl ethyl ketone.

The graft ratio of the acrylic graft copolymer (A) is an index representing the ratio by weight of the monomer mixture (A-b) grafted to the acrylic ester rubbery polymer (A-a) to the (A-a), the weight of which is regarded as 100. The graft ratio of the acrylic graft copolymer (A) is from 30 to 250%, more preferably from 50 to 230%, most preferably from 70 to 220%. If the graft ratio is less than 30%, the flex whitening resistance is impaired and the transparency lowers. Moreover, the elongation at tensile fracture lowers; thus, when the film is cut, the film tends to be easily cracked. If the ratio is more than 250%, the melting viscosity becomes high when the composition is formed into a film. Thus, the formability of the film tends to lower.

The acrylic graft copolymer (A) used in the present invention is copolymeized with an ultraviolet absorber represented by the following general formula (1) to make a methacrylic resin composition:

general formula (1)

[formula 2]

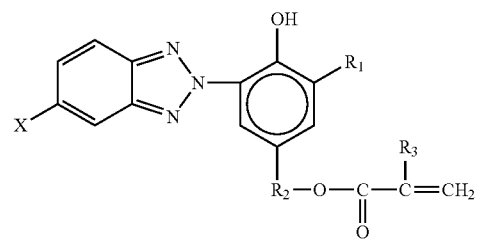

wherein X is H or a halogen, $R_1$ is H, methyl or a t-alkyl group which has 4 to 6 carbon atoms, $R_2$ is an alkylene group which is in a linear or branched chain form and has 2 to 10 carbon atoms, and $R_3$ is H or methyl.

The ultraviolet absorber represented by the general formula (1) in the present invention is a 2-(2'-hydroxy-5'-methacryloyloxyethylphenyl)-2H-benzotriazole compound, such as 2-(2'-hydroxy-5'-acryloyloxyethylphenyl)-2H-benzotriazole, 2-(2'-hydroxy-5'-methacryloyloxyethylphenyl)-2H-benzotriazole, 2-(2'-hydroxy-5'-methacryloyloxyethylphenyl)-5-chloro-2H-benzotriazole, 2-(2'-hydroxy-5'-methacryloyloxypropylphenyl)-2H-benzotriazole, or 2-(2'-hydroxy-5'-methacryloyloxyethyl-3'-t-butylphenyl)-2H-benzotriazole. The ultraviolet absorber is more preferably 2-(2'-hydroxy-5'-methacryloyloxyethylphenyl)-2H-benzotriazole from the viewpoint of costs and handleability.

The copolymerization ratio of the ultraviolet absorber represented by the general formula (1) in the present invention is preferably from 0.01 to 30 parts by weight for 100 parts by weight of the acrylic graft copolymer (A), more preferably from 0.01 to 25 parts by weight, even more preferably 0.01 to 20 parts by weight, in particular preferably 0.05 to 20 parts by weight. If the copolymerization ratio of the ultraviolet absorber represented by the general formula (1) is less than 0.01 part by weight, the weather resistance of the film which can be formed from the resultant methacrylic resin composition tends to lower. If the ratio is more than 30 parts by weight, the impact resistance and the flex cracking resistance of the film tend to be impaired.

The copolymerization of the ultraviolet absorber represented by the general formula (1) in the present invention may be attained in any layer of the acrylic graft copolymer (A) In other words, the ultraviolet absorber may be copolymerized with the acrylic ester rubbery polymer (A-a), or may be copolymerized with the monomer mixture (A-b). More preferably, the ultraviolet absorber is preferably copolymerized with both of the acrylic ester rubbery polymer (A-a) and the monomer mixture (A-b). In particular, it is more preferred that the ultraviolet absorber is uniformly copolymerized with the whole of the acrylic graft copolymer (A).

The methacrylic ester copolymer (B) in the present invention is obtained by copolymerizing a monomer mixture which contains a methacrylic ester monomer and an acrylic ester monomer (hereinafter referred to as the methacrylic ester type monomers) at the ratio by weight of the former to the latter of from 90/10 to 100/0, and which further contains the methacrylic ester type monomers and an ultraviolet absorber represented by the general formula (1) so as to set the ratio by weight of the former to the latter in the range of 100/0.01 to 100/30.

The ratio by weight of the methacrylic ester monomer to the acrylic ester monomer is preferably from 93/7 to 100/0, more preferably from 95/5 to 100/0. Furthermore, the ratio is even more preferably from 97/3 to 100/0, in particular preferably 100/0. It is preferable when the methacrylic ester is contained at a ratio of 93% or more by weight, since transparency, hardness, heat resistance and chemical resistance become better.

The ratio by weight of the methacrylic ester type monomers to the ultraviolet absorber represented by the general formula (1) is more preferably from 100/0.01 to 100/25, even more preferably from 100/0.01 to 100/20, in particular preferably from 100/0.05 to 100/20. When the ratio ranges from 100/0.01 to 100/30, depolymerization is favorably restrained when the composition is used.

The process for producing the acrylic graft copolymer (A) in the present invention is not particularly limited, and may be emulsion polymerization, emulsion-suspension polymerization, suspension polymerization, bulk polymerization or solution polymerization, each of which is known, in particular preferably emulsion polymerization.

The method for copolymerizing the ultraviolet absorber represented by the general formula (1) in the present invention is not particularly limited, and is preferably copolymerized in the middle of producing the acrylic graft copolymer (A). The copolymerization method may be emulsion polymerization, emulsion-suspension polymerization, suspension polymerization, bulk polymerization or solution polymerization, each of which is known, in particular preferably emulsion polymerization.

As an initiator in the polymerization of the acrylic ester rubbery polymer (A-a) in the present invention, a known initiator such as an organic peroxide, an inorganic peroxide, or an azo compound may be used. Specifically, for example, the following may be used: t-butylhydroperoxide, 1,1,3,3-tetramethylbutylhydroperoxide, peroxysuccinic acid, t-butyl peroxymaleate, cumenehydroperoxide, benzoylperoxide and other organic peroxides; potassium persulfate, sodium persulfate and other inorganic peroxides; and oil soluble initiators such as azobisisobutyronitrile. These may be used alone or in combination of two or more thereof. These initiators may each be used as an ordinary redox initiator in the form of being combined with a reducing agent such as sodium sulfite, sodium thiosulfate, sodium formaldehydesulfoxylate, ascorbic acid, hydroxyacetonic acid, ferrous sulfate or a complex of ferrous sulfate and disodium ethylenediaminetetraacetate.

The organic peroxide may be added by a known adding method such as a method of adding the peroxide as it is to the polymerization system, a method of mixing the peroxide with the monomer(s), and adding the resultant, or a method of dispersing the peroxide into an aqueous solution of an emulsion, and adding the resultant. Preferred is the method of mixing the peroxide with the monomer(s), and adding the resultant, or the method of dispersing the peroxide into an aqueous solution of an emulsion, and adding the resultant from the viewpoint of transparency.

The organic peroxide is preferably used as a redox initiator in the form of being combined with an inorganic reducing agent, such as a ferrous salt, and/or an organic reducing agent, such as sodium formaldehydesulfoxylate, a reducing sugar or ascorbic acid from the viewpoint of polymerization stability and the control of the particle diameter.

The surfactant used in the emulsion polymerization is not particularly limited, and any ordinary surfactant for emulsion polymerization may be used. Specific examples thereof include anionic surfactants such as sodium alkylsulfonate, sodium alkylbenzenesulfonate, sodium dioctylsulfosuccinate, sodium laurylsulfonate and aliphatic acid sodium salts, and nonionic surfactants such as alkylphenols and a reaction product made from aliphatic alcohols and propylene oxide or ethylene oxide. These surfactants may be used alone or in combination of two or more thereof. If necessary, a cationic surfactant such as an alkylamine salt may be used.

The average particle diameter of the acrylic graft copolymer (A) obtained in the present invention is preferably larger than the average particle diameter d of the acrylic ester rubbery polymer (A-a) and is more than 100 nm and 400 nm or less. In particular, the average particle diameter is more preferably more than 100 nm and 350 nm or less, even more preferably more than 100 nm and 300 nm or less. If the average particle diameter of the acrylic graft copolymer (A) is 100 nm or less, the impact resistance and the flex cracking resistance of the film that can be formed from the resultant methacrylic resin composition tend to lower. If the average particle diameter is more than 400 nm, the transparency of the film tends to lower.

The resultant latex of the acrylic graft copolymer (A) is subjected to ordinary operations of solidifying, washing and drying, or subjected to spray drying, freeze drying or some other treatments, whereby a resin composition is separated and collected.

The methacrylic polymer (B) used in the present invention is a polymer containing 80% or more by weight of a methacrylic ester, more preferably 85% or more by weight thereof, even more preferably 90% or more by weight thereof. If the amount of the methacrylic ester is less than 80% by weight, the hardness and the rigidity of the resultant film tend to lower.

Examples of a monomer other than methyl methacrylate in the methacrylic polymer (B) in the present invention include the monomers listed up as the monomer that can be used in the acrylic graft copolymer (A). These monomers may be used alone or in combination of two or more thereof. Specifically, the methacrylic polymer (B) may be a methacrylic polymer obtained by copolymerizing a monomer mixture containing a methacrylic ester and an acrylic ester at the ratio by weight of the former to the latter of from 90/10 to 100/0, and containing an ultraviolet absorber represented by the general formula (1) in an amount of 0.01 to 30 parts by weight for 100 parts by weight of the methacrylic ester.

It is preferred to use, as the methacrylic ester used in the methacrylic polymer (B), methyl methacrylate at a ratio of 80% or more by weight of the total methacrylic polymer (B). It is more preferred to use only methyl methacrylate.

The methacrylic polymer (B) in the present invention can be polymerized separately from the acrylic graft copolymer (A). In this case, the polymerizing method is not particularly limited, and may be emulsion polymerization, emulsion-suspension polymerization, suspension polymerization, bulk polymerization or solution polymerization, each of which is known.

The initiator that can be used in the polymerization of the methacrylic polymer (B) may be a known initiator such as an organic peroxide, an inorganic peroxide or an azo compound. Specific examples thereof include organic peroxides such as t-butylhydroperoxide, 1,1,3,3-tetramethylbutylhydroperoxide, succinic acid peroxide, t-butyl peroxymaleate, cumenehydroperoxide, benzoylperoxide, lauroylperoxide, t-butyl peroxybenzoate, isopropyl-t-butyl peroxycarbonate, butyl peroxybenzoate, 1,1-bis(alkylperoxy)3,3,5-trimethylcyclohexane, and 1,1-bis(alkylperoxy)cyclohexane; inorganic peroxides such as potassium persulfate, and sodium persulfate; and azo compounds such as azobisisobutyronitrile. These may be used alone or in combination of two or more thereof.

The organic peroxide may be added by a known adding method such as a method of adding the peroxide as it is to the polymerization system, a method of mixing the peroxide with the monomer(s), and adding the resultant, or a method of dispersing the peroxide into an aqueous solution of an emulsion, and adding the resultant. Preferred is the method of mixing the peroxide with the monomer(s), and adding the resultant from the viewpoint of transparency.

The dispersing agent used in the suspension polymerization may be a dispersing agent that is ordinarily used in suspension polymerization, and examples thereof include polymeric dispersing agents such as polyvinyl alcohol, polyvinyl pyrrolidone, and polyacrylamide, and poorly water-soluble inorganic salts such as calcium phosphate, hydroxyapatite, and magnesium pyrophosphate. In the case of using a poorly water-soluble inorganic salt, it is effective to use an anionic surfactant, such as sodium α-olefinsulfonate, or sodium dodecylbenzenesulfonate, together since the dispersion stability is promoted. The above-mentioned dispersing agents may each be added one or more times in the polymerization in order to adjust the particle diameter of the resultant resin particles.

The content by percentage of the acrylic ester rubbery polymer (A-a) in the resin composition (C) used in the present invention is preferably from 5 to 45% by weight, more preferably from 10 to 30% by weight. If the content of the acrylic ester rubbery polymer (A-a) is less than 5% by weight, the elongation at tensile fracture of the resultant film lowers so that the film is easily cracked when cut. Moreover, stress whitening tends to be easily generated. If the content is more than 45% by weight, the hardness and the rigidity of the resultant film tend to lower.

The reduced viscosity of a fraction soluble in methyl ethyl ketone of the methacrylic resin composition (C) used in the present invention is preferably from 0.2 to 0.8 dl/g, more preferably from 0.2 to 0.7 dl/g, even more preferably from 0.2 to 0.6 dl/g. If the reduced viscosity of the fraction soluble in methyl ethyl ketone of the methacrylic resin composition (C) is less than 0.2 dl/g, the elongation at tensile fracture of the resultant film lowers so that the film is easily cracked when cut. Moreover, the solvent resistance tends to lower. If the reduced viscosity is more than 0.8 dl/g, the formability of a film tends to lower.

The methacrylic resin composition (C) yielded in the present invention can be formed into various molded products by various plastic working processes, such as injection molding, extrusion molding, blow molding, and compression molding.

The methacrylic resin composition (C) of the present invention is particularly useful as a film. The composition is satisfactorily processed by an inflation method or a T die extrusion method, which is an ordinary melt extrusion method, or a calendaring method, solvent casting method or some other methods. As the needs arises, at the time of forming the composition into a film, both surfaces of the film are simultaneously brought into contact with a roll or metallic belt, in particular, a roll or metallic belt heated to a temperature more than or equal to the glass transition temperature, thereby making it possible to yield a film better in surface property. In accordance with a purpose, film lamination molding or alternation of the property of the film by biaxial stretching may be performed.

If necessary, the following may be blended with the methacrylic resin composition (C) of the present invention: polyglutarimide, glutaric anhydride polymer, lactone-cyclized methacrylic resin, methacrylic resin, polyethylene terephthalate resin, polybutylene terephthalate resin, or the like. The method for the blending is not particularly limited, and may be a known method.

If necessary, the following may be added to the methacrylic resin composition (C) of the present invention alone or in combination of two or more thereof: an inorganic or organic pigment for coloring, an antioxidant, heat stabilizer, ultraviolet absorber, ultraviolet stabilizer or the like for improving the stability against heat or light, an antibacterial agent, a deodorant, a lubricant, or others.

The film obtained from the methacrylic resin composition (C) of the present invention is preferably from 10 to 300 μm in thickness, more preferably from 10 to 200 μm. If the thickness of the film is less than 10 μm, the workability of the film tends to lower. If the thickness is more than 300 μm, the transparency of the resultant film tends to lower.

The gloss of the surface of the film obtained from the methacrylic resin composition (C) of the present invention can be decreased by a known method if necessary. This can be carried out by, e.g., a method of kneading an inorganic filler or crosslinking polymeric particles into the methacrylic resin composition (C). By subjecting the resultant film to embossing, the gloss of the film surface may be decreased.

The film obtained from the methacrylic resin composition of the present invention may be used in the form of being laminated onto a metal, a plastic or the like. The method for laminating the film may be lamination molding, wet laminating, wherein an adhesive is painted onto a metallic plate such as a steel plate, the film is put onto the metallic plate and then the resultant is dried to cause the two to adhere to each other, dry laminating, extrusion laminating, hot melt laminating, or the like.

The method for laminating the film on a plastic member may be insert molding or laminate injection press molding, wherein the film is arranged in a mold and then a resin is filled thereinto by injection molding, or in-mold formation, wherein the film is pre-molded, the film is then arranged in a mold and a resin is filled thereinto by injection molding.

EXAMPLES

The present invention will be described in more detail by way of the following examples; however, the present invention is not limited only to the examples. About physical properties measured in the examples and comparative examples, individual methods for the measurements are as follows:

(Measurement of Polymerization Conversion Ratio)

Any yielded methacrylic resin composition (C) latex was dried in a hot wind drying machine at 120° C. for 1 hour to obtain the amount of solids. From the following equation, the polymerization conversion ratio was calculated:

Polymerization conversion ratio(%)=(solid amount/ charged monomer amount)×100

(Measurement of Graft Ratio)

One gram of any yielded acrylic graft copolymer (A) was dissolved in 40 mL of methyl ethyl ketone, and the resultant was subjected to centrifugation with a centrifugal separator (CP60E, manufactured by Hitachi Plant Engineering & Construction Co., Ltd.) at a rotation number of 3000 rpm for 1 hour to separate insoluble parts and soluble parts. The resultant insoluble matters were regarded as the acrylic ester rubbery polymer (A-a) and the graft component (A-b), and the graft ratio was calculated from the following equation:

Graft ratio(%)={(weight of matters insoluble in methyl ethyl ketone−weight of acrylic ester cross linked elastic body particles(A-a))/weight of acrylic ester cross linked elastic body particles (A-a))}×100

The percentage by weight of the acrylic graft copolymer (A) was calculated from the following formula:

{(Parts by weight of acrylic ester cross linked elastic body particles(A-a))×(100+graft ratio(%))}/100

Furthermore, the percentage by weight of the methacrylic polymer (B) was calculated from the following formula:

100−(percentage by weight of acrylic graft copolymer (A))

(Measurement of Reduced Viscosity)

As for a solution wherein 150 mg of the parts soluble in methyl ethyl ketone, which were obtained by the operation for the measurement of the graft ratio, were dissolved in 50 mL of N,N-dimethylformamide, the reduced viscosity was measured in accordance with JIS K6721.

(Measurement of Average Particle Diameter)

Any yielded acrylic ester rubbery polymer (A-a) latex and any yielded acrylic graft copolymer (A) latex were each diluted to have a solid concentration of 0.02%. The resultant was used as a sample, and the average particle diameter was obtained on the basis of the light transmittance at a wavelength of 546 nm, using a spectrophotometer (Spectrophotometer U-2000, manufactured by Hitachi Ltd.).

(Evaluation of Transparency)

The transparency of any yielded film was measured by calculating the haze at a temperature of 23±2° C. and a humidity of 50±5% in accordance with JIS K6714.

(Evaluation of Pencil Hardness)

The pencil hardness of any yielded film was measured in accordance with JIS S-1005.

(Evaluation of Flex Cracking Resistance)

Any yielded film was bent one time at 180 degrees, and then a change in the bent portion was observed to make an evaluation as described below.

1: The film was not cracked.
2: The film was cracked.

(Evaluation of Flex Whitening Resistance)

Any yielded film was bent one time at 180 degrees, and then a change in the bent portion was observed to make an evaluation as described below.

1: The bent portion did not whiten.
2: The bent portion slightly whitened.
3: The bent portion largely whitened.

(Evaluation of Formability)

Film forming was continuously performed for 3 hours. The operation situation thereof was observed to make an evaluation on the following criterion:

1: The thickness of the film was even, and the film was able to be formed without being broken.
2: The thickness of the film was uneven, or a break was generated in the film.

(Evaluation of Bleeding Property of Ultraviolet Absorber)

Film forming was continuously performed for 3 hours. The adhesion conditions thereof onto the cooling roll was observed to make an evaluation on the following criterion:

1: The film did not adhere to the cooling roll.
2: The film adhered to the cooling roll.

(Chemical Resistance)

At a temperature of 23° C., COPPERTONE (manufactured by SSL Healthcare Japan Ltd.) was applied thinly onto any yielded film, and the resultant was allowed to stand still at 23° C. for 1 hour. Thereafter, the resultant was allowed to stand still at 50° C. for 1 hour, and the COPPERTONE was rubbed off with a piece of wet gauze. The surface of the film was observed visually to make an evaluation on the basis of the following criterion:

1: The COPPERTONE was rubbed off without any mark being left.
2: A mark was slightly recognized.
3: A mark was evidently recognized.

(Heat Decomposition Property)

Analysis was made by use of a TGA (TAS100, manufactured by Rigaku Corporation.) to evaluate the weight decrease ratios at 100° C., which was a starting temperature, 200° C., 250° C., and 300° C., respectively. The analysis was made under conditions that the nitrogen flow was 50 mL/min., and the temperature raising rate was 10° C./min.

In production examples, the examples and the comparative examples, "part(s)" and "%" represent a part or parts by weight, and % by weight, respectively. Moreover, each abbreviation therein represents the following material:

OSA: sodium dioctylsulfosuccinate,
BA: butyl acrylate,
MMA: methyl methacrylate,
CHP: cumenehydroperoxide,
tDM: tertiary dodecylmercaptan,
AlMA: allyl methacrylate, and
RUVA: 2-(2'-hydroxy-5'-methacryloyloxyethylphenyl)-2-H-benzotriazole (RUVA-93, manufactured by Otsuka Chemical Co., Ltd.).

Production Example 1

Acrylic Graft Copolymer (A)

The following materials were charged into an 8 L polymerizing device equipped with a stirrer:

Deionized water: 200 parts
Sodium dioctylsulfosuccinate: 0.25 part
Sodium formaldehydesulfoxylate: 0.15 part
Ethylenediaminetetraacetic acid-2-sodium: 0.001 part
Ferrous sulfate: 0.00025 part The polymerizing device was sufficiently purged with nitrogen gas to make the inside thereof into a state that oxygen was not substantially present. Thereafter, the internal temperature was set to 60° C., and a monomer mixture (A-a) described in Table 1 [that is, 30 parts of a monomer mixture composed of 1 part of AlMA and 0.2 part of CHP, and 0.6 part of RUVA for 100parts of a monomer mixture composed of 90% of BA and 10% of MMA] was continuously added thereto at a rate of 10 parts/hour. After the addition, the polymerization was further continued for 0.5 hour to yield an acrylic ester rubbery polymer (A-a). The polymerization conversion ratio was 99.5%.

Thereafter, 0.05 part of sodium dioctylsulfosuccinate was charged thereinto, and then the internal temperature was set to 60° C. Then, a monomer mixture (A-b) described in Table 1[that is, 70 parts of a monomer mixture composed of 0.5 part of tDM and 0.5 part of CHP, and 1.4parts of RUVA for 100 parts of a monomer mixture composed of 10% of BA and 90%of MMA]was continuously added thereto at a rate of 10 parts/hour, and further the polymerization was continued for 1 hour to yield an acrylic graft copolymer (A). The polymerization conversion ratio was 98.5%.

The resultant latex was subjected to salting-out with calcium chloride, coagulated, washed with water, and dried to yield a resin powder (1). Furthermore, a monoaxial extruder with a vent of 40 mm in diameter (HV-40-28, manufactured by TABATA Industrial Machinery Co., Ltd.), the temperature of its cylinder being set to 240° C., was used to melt-knead the powder into the form of pellets.

structural formula (2)

[formula 3]

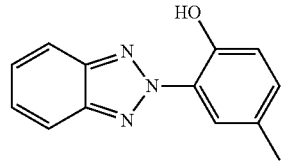

Production Example 13

Methacrylic Polymer (B)

A methacrylic polymer (B) was produced by the same operation (emulsion polymerization) as in production example 1 except that the monomer composition was changed to 95% of MMA and 5% of BA. The reduced viscosity of the resultant methacrylic polymer (B) was 0.36 dl/g.

TABLE 1

| | | Production examples | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| OSA | Part(s) | 0.20 | 0.24 | 0.18 | 0.28 | 0.35 | 0.20 | 0.20 | 0.05 | 0.15 | 0.05 | 0.20 | 0.50 |
| Monomer mixture (A-a) | Parts by weight | 20 | 23 | 25 | 30 | 50 | 20 | 20 | 3 | 20 | 30 | 60 | 30 |
| | BA (%) | 90 | 90 | 90 | 90 | 90 | 90 | 90 | 100 | 90 | 90 | 90 | 90 |
| | MMA (%) | 10 | 10 | 10 | 10 | 10 | 10 | 10 | 0 | 10 | 10 | 10 | 10 |
| | AlMA part(s) | 2 | 2 | 2.5 | 3.5 | 2 | 2 | 2 | 2 | 7 | 2.5 | 1.0 | 2 |
| | CHP Part(s) | 0.06 | 0.08 | 0.08 | 0.09 | 0.12 | 0.06 | 0.06 | 0.05 | 0.05 | 0.09 | 0.06 | 0.09 |
| | RUVA Part(s) | 0.4 | 1.2 | 0.5 | 0.03 | 10 | 0 | 7 | 0.06 | 0.4 | 0.6 | 1.2 | 0.03 |
| Monomer mixture (A-b) | Parts by weight | 80 | 77 | 75 | 70 | 60 | 80 | 80 | 97 | 82 | 70 | 40 | 70 |
| | BA (%) | 10 | 10 | 10 | 10 | 10 | 10 | 10 | 10 | 10 | 10 | 10 | 10 |
| | MMA (%) | 90 | 90 | 90 | 90 | 90 | 90 | 90 | 90 | 90 | 90 | 90 | 90 |
| | CHP Part(s) | 0.3 | 0.3 | 0.3 | 0.3 | 0.3 | 0.3 | 0.3 | 0.3 | 0.3 | 0.3 | 0.3 | 0.3 |
| | tDM Part(s)) | 0.3 | 0.28 | 0.25 | 0.25 | 0.28 | 0.3 | 0.3 | 0.25 | 0.3 | 0.3 | 0.4 | 0.25 |
| | RUVA Part(s) | 1.6 | 3.8 | 1.5 | 0.07 | 10 | 0 | 28 | 1.94 | 1.6 | 1.4 | 0.8 | 0.07 |
| Reduced viscosity (dl/g) | | 0.32 | 0.35 | 0.36 | 0.39 | 0.40 | 0.32 | 0.32 | 0.21 | 0.34 | 0.30 | 0.25 | 0.35 |
| Graft ratio (%) | | 135 | 130 | 140 | 165 | 60 | 135 | 135 | 250 | 200 | 120 | 25 | 120 |
| Rubbery polymer (A-a) particle diameter (nm) | | 80 | 60 | 120 | 78 | 80 | 80 | 80 | 80 | 80 | 230 | 80 | 50 |
| Graft co-polymer (A) particle diameter (nm) | | 125 | 115 | 152 | 123 | 117 | 125 | 124 | 135 | 125 | 350 | 102 | 82 |

Production Examples 2 to 12

Acrylic Graft Copolymers (A)

The same polymerization, coagulation, washing with water and drying as in production example 1 were conducted except that the composition of the monomers was changed as shown in Table 1, so as to yield each of resin powders (2) to (12). Furthermore, melt-kneading was conducted to make each of the powders into the form of pellets. However, in production example 7, no resin powder was yielded since the latex aggregated in the polymerization. Thus, neither pellet nor film was prepared so that no film physical properties were able to be evaluated. In production example 6, 2 parts of a TINUVIN P (manufactured by Ciba Specialty Chemicals Inc.) represented by a structural formula (2) were blended, as an ultraviolet absorber, with the resultant resin powder, and the resultant was then melt-kneaded and made into the form of pellets.

Production Example 14

Methacrylic Polymer (B)

As a methacrylic polymer (B), prepared was an MMA-EA copolymer produced by suspension polymerization (SUMIPEX EX, manufactured by Sumitomo Chemical Co., Ltd.: copolymer composed of about 95% of MMA and about 5% of EA; reduced viscosity: 0.30 dl/g).

Examples 1 to 7, and Comparative Examples 1 to 6

A 40-mm diameter extruder with a T die (NEX 040397, manufactured by Nakamura Sanki Kabushiki Kaisha) was used to extrude the pellets yielded in each of the production examples, wherein each combination shown in Table 2 was used, at a cylinder setting temperature of 160 to 235° C. and a dice temperature of 240° C., so as to yield a film of 100 μm thickness. The resulting individual films were used to evaluate the above-mentioned various properties. The results are shown in Table 2.

TABLE 2

|  |  | Examples ||||||| Comparative Examples ||||||
|  |  | 1 | 2 | 3 | 4 | 5 | 6 | 7 | 1 | 2* | 3 | 4 | 5 | 6 |
|---|---|---|---|---|---|---|---|---|---|---|---|---|---|---|
| Resin compositions | Production Example 1 | 100 | | | | | | | | | | | | |
|  | Production Example 2 | | 100 | | | | | | | | | | | |
|  | Production Example 3 | | | 100 | | | | | | | | | | |
|  | Production Example 4 | | | | 70 | 80 | | | | | | | | |
|  | Production Example 5 | | | | | | 50 | | | | | | | |
|  | Production Example 6 | | | | | | | | 100 | | | | | |
|  | Production Example 7 | | | | | | | | | 100 | | | | |
|  | Production Example 8 | | | | | | | | | | 100 | | | |
|  | Production Example 9 | | | | | | | | | | | 100 | | |
|  | Production Example 10 | | | | | | | | | | | | 70 | |
|  | Production Example 11 | | | | | | | | | | | | | 100 |
|  | Production Example 12 | | | | | | | 70 | | | | | | |
|  | Production Example 13 | | | | | 20 | | | | | | | | |
|  | Production Example 14 | | | | 30 | | 50 | 30 | | | | | 30 | |
| Rubbery polymer (A-a) particle diameter (nm) | | 80 | 60 | 120 | 78 | 78 | 80 | 50 | 80 | — | 80 | 80 | 230 | 80 |
| Crosslinking agent amount in the (A-a) (%) | | 2.0 | 2.0 | 2.5 | 3.5 | 3.5 | 2.0 | 2.0 | 2.0 | 2.0 | 2.0 | 7.0 | 2.5 | 1.0 |
| Rubber amount (%) | | 20 | 23 | 23 | 21 | 24 | 24 | 30 | 20 | 20 | 3 | 20 | 21 | 60 |
| Graft ratio (%) | | 135 | 130 | 140 | 165 | 165 | 60 | 120 | 135 | — | 250 | 200 | 120 | 25 |
| Reduced viscosity (dl/g) | | 0.32 | 0.35 | 0.36 | 0.35 | 0.33 | 0.35 | 0.35 | 0.32 | — | 0.21 | 0.34 | 0.3 | 0.25 |
| Graft copolymer (A) particle diameter (nm) | | 125 | 115 | 152 | 123 | 123 | 117 | 82 | 125 | 124 | 135 | 125 | 350 | 102 |
| Flex resistance | Cracking | 1 | 1 | 1 | 1 | 1 | 1 | 1 | 1 | — | 2 | 2 | 1 | 1 |
|  | Whitening | 1 | 1 | 1 | 1 | 1 | 1 | 2 | 1 | — | 3 | 1 | 1 | 3 |
| Transparency (cloudiness value) (%) | | 0.6 | 0.4 | 0.5 | 0.6 | 0.6 | 0.8 | 0.5 | 0.5 | — | 0.5 | 0.6 | 2.4 | 0.8 |
| Pencil hardness | | H | H | H | H | H | H | H | H | — | 2H | H-2H | H | H |
| Bleed property | | 1 | 1 | 1 | 1 | 1 | 1 | 1 | 2 | — | 1 | 1 | 1 | 1 |

*In Production Example 7, the latex aggregated at the time of the emulsion polymerization thereof; thus, no resin powder was yielded and no film was able to be formed.

Production Examples 15 to 20, and 22 to 30

Acrylic Graft Copolymers (A)

The same polymerization, coagulation, washing with water and drying as in production example 1 were conducted except that the composition of the monomers was changed as shown in Table 3, so as to yield each of resin powders (15) to (30). Furthermore, melt-kneading was conducted to make each of the powders into the form of pellets.

However, in production example 23, no resin powder was yielded since the latex aggregated during the polymerization. Thus, neither pellet nor film was prepared so that no film physical properties were able to be evaluated. In production examples 22 and 28 to 30, 2 parts of a TINUVIN P (manufactured by Ciba Specialty Chemicals Inc.), which is represented by the above-mentioned structural formula (2), were blended, as an ultraviolet absorber, with each of the resultant resin powders. The resultants were then melt-kneaded and made into the form of pellets.

TABLE 3

|  |  | Production Examples ||||||||
|  |  | 15 | 16 | 17 | 18 | 19 | 20 | 21 | 22 |
|---|---|---|---|---|---|---|---|---|---|
| OSA | Part | 0.30 | 0.27 | 0.25 | 0.24 | 0.24 | 0.24 | 0.24 | 0.24 |
| Monomer mixture (A-a) | Parts by weight | 30 | 20 | 20 | 20 | 20 | 30 | — | 20 |
|  | BA (%) | 90 | 90 | 90 | 90 | 90 | 90 | — | 90 |
|  | MMA (%) | 10 | 10 | 10 | 10 | 10 | 10 | — | 10 |
|  | AIMA Part(s) | 2 | 3.5 | 4 | 2 | 2 | 2 | — | 2 |
|  | CHP Part(s) | 0.06 | 0.06 | 0.06 | 0.06 | 0.06 | 0.06 | — | 0.06 |
|  | RUVA Part(s) | 0.6 | 0.3 | 0.3 | 0.6 | 0.3 | 0.3 | — | 0 |

TABLE 3-continued

| | | | | | | | | | |
|---|---|---|---|---|---|---|---|---|---|
| Monomer mixture (A-b) | Parts by weight | 70 | 80 | 80 | 80 | 80 | 80 | 100 | 80 |
| | BA (%) | 10 | 10 | 10 | 0 | 5 | 7 | 0 | 10 |
| | MMA (%) | 90 | 90 | 90 | 100 | 95 | 93 | 100 | 90 |
| | CHP Part(s) | 0.3 | 0.3 | 0.3 | 0.3 | 0.3 | 0.3 | 0.3 | 0.3 |
| | tDM Part(s) | 0.3 | 0.3 | 0.3 | 0.3 | 0.3 | 0.3 | 0.3 | 0.3 |
| | RUVA Part(s) | 1.4 | 0.7 | 0.7 | 1.4 | 0.7 | 0.7 | 1 | 0 |
| Reduced viscosity (dl/g) | | 0.31 | 0.3 | 0.3 | 0.34 | 0.33 | 0.32 | 0.35 | 0.32 |
| Graft ratio (%) | | 135 | 140 | 140 | 141 | 140 | 139 | — | 135 |
| Rubbery polymer (A-a) particle diameter (nm) | | 70 | 150 | 100 | 80 | 80 | 80 | — | 80 |

| | | Production Examples | | | | | | | |
|---|---|---|---|---|---|---|---|---|
| | | 23 | 24 | 25 | 26 | 27 | 28 | 29 | 30 |
| OSA | Part | 0.24 | 0.05 | 0.15 | 0.05 | 0.24 | 0.24 | 0.24 | 0.24 |
| Monomer mixture (A-a) | Parts by weight | 20 | 3 | 20 | 30 | 60 | 20 | 20 | 20 |
| | BA (%) | 90 | 100 | 90 | 90 | 90 | 90 | 90 | 90 |
| | MMA (%) | 10 | 0 | 10 | 10 | 10 | 10 | 10 | 10 |
| | AIMA Part(s) | 2 | 2 | 7 | 2.5 | 1.0 | 2 | 2 | 2 |
| | CHP Part(s) | 0.06 | 0.05 | 0.05 | 0.09 | 0.06 | 0.06 | 0.06 | 0.06 |
| | RUVA Part(s) | 7 | 0.06 | 0.4 | 0.6 | 1.2 | 0 | 0 | 0 |
| Monomer mixture (A-b) | Parts by weight | 80 | 97 | 82 | 70 | 40 | 80 | 80 | 80 |
| | BA (%) | 10 | 10 | 10 | 10 | 10 | 0 | 5 | 10 |
| | MMA (%) | 90 | 90 | 90 | 90 | 90 | 100 | 95 | 90 |
| | CHP Part(s) | 0.3 | 0.3 | 0.3 | 0.3 | 0.3 | 0.3 | 0.3 | 0.3 |
| | tDM Part(s) | 0.3 | 0.25 | 0.3 | 0.3 | 0.4 | 0.3 | 0.3 | 0.3 |
| | RUVA Part(s) | 28 | 1.94 | 1.6 | 1.4 | 0.8 | 0 | 0 | 0 |
| Reduced viscosity (dl/g) | | 0.32 | 0.21 | 0.34 | 0.30 | 0.25 | 0.32 | 0.31 | 0.32 |
| Graft ratio (%) | | 135 | 250 | 200 | 120 | 25 | 140 | 139 | 140 |
| Rubbery polymer (A-a) particle diameter (nm) | | 80 | 80 | 80 | 230 | 80 | 80 | 80 | 80 |

Production Example 21

Methacrylic Polymer (B)

A methacrylic polymer (B) was produced by the same operation (emulsion polymerization) as in production example 1 except that the monomer composition was changed to 100% of MMA. The reduced viscosity of the resulting methacrylic polymer (B) was 0.35 dl/g.

Examples 8 to 14, and Comparative Examples 7 to 15)

A 40-mm diameter extruder with a T die (NEX 040397, manufactured by Nakamura Sanki Kabushiki Kaisha) was used to extrude, at a cylinder setting temperature of 160 to 235° C. and a dice temperature of 240° C., the pellets yielded in each of the production examples wherein each combination shown in Table 4 was used, so as to yield a film of 100 µm thickness. The resulting films were used to evaluate the above-mentioned various properties. The results are shown in Table 4.

TABLE 4

| | | Examples | | | | | | | Comparative Examples | |
|---|---|---|---|---|---|---|---|---|---|---|
| | | 8 | 9 | 10 | 11 | 12 | 13 | 14 | 7 | 8* |
| Resin compositions | Production Example 15 | 70 | | | | | | | | |
| | Production Example 16 | | 70 | | | | | | | |
| | Production Example 17 | | | 100 | | | | | | |
| | Production Example 18 | | | | 100 | | | | | |
| | Production Example 19 | | | | | 100 | | | | |
| | Production Example 20 | | | | | | 70 | | | |
| | Production Example 21 | 30 | 30 | | | | 30 | 100 | | |
| | Production Example 22 | | | | | | | | 100 | |
| | Production Example 23 | | | | | | | | | 100 |
| | Production Example 24 | | | | | | | | | |
| | Production Example 25 | | | | | | | | | |
| | Production Example 26 | | | | | | | | | |
| | Production Example 27 | | | | | | | | | |
| | Production Example 28 | | | | | | | | | |
| | Production Example 29 | | | | | | | | | |
| | Production Example 30 | | | | | | | | | |
| Chemical resistance | | 3 | 3 | 3 | 1 | 2 | 3 | 1 | 3 | — |
| Weight decrease | 200° C. | 0.13 | 0.12 | 0.13 | 0.13 | 0.13 | 0.11 | 0.13 | 0.13 | — |
| | 250° C. | 0.79 | 0.80 | 0.81 | 0.79 | 0.80 | 0.79 | 0.79 | 0.79 | — |

TABLE 4-continued

|  |  | | | | | | | | |
|---|---|---|---|---|---|---|---|---|---|
| ratios (%) | 300 degrees | 2.32 | 2.32 | 2.34 | 2.31 | 2.32 | 2.31 | 2.33 | 2.35 | — |
| Flex resistance | Cracking | 1 | 1 | 1 | 1 | 1 | 1 | 1 | 1 | — |
|  | Whitening | 1 | 1 | 1 | 1 | 1 | 1 | 1 | 1 | — |
| Transparency (cloudiness value) | | 0.3 | 0.5 | 0.6 | 0.5 | 0.6 | 0.5 | 0.1 | 0.5 | — |
| Bleed property | | 1 | 1 | 1 | 1 | 1 | 1 | 1 | 2 | — |

|  |  | Comparative Examples | | | | | | |
|---|---|---|---|---|---|---|---|---|
|  |  | 9 | 10 | 11 | 12 | 13 | 14 | 15 |
| Resin compositions | Production Example 15 | | | | | | | |
|  | Production Example 16 | | | | | | | |
|  | Production Example 17 | | | | | | | |
|  | Production Example 18 | | | | | | | |
|  | Production Example 19 | | | | | | | |
|  | Production Example 20 | | | | | | | |
|  | Production Example 21 | | | 30 | 30 | | | |
|  | Production Example 22 | | | | | | | |
|  | Production Example 23 | | | | | | | |
|  | Production Example 24 | 100 | | | | | | |
|  | Production Example 25 | | 100 | | | | | |
|  | Production Example 26 | | | 70 | | | | |
|  | Production Example 27 | | | | 70 | | | |
|  | Production Example 28 | | | | | 100 | | |
|  | Production Example 29 | | | | | | 100 | |
|  | Production Example 30 | | | | | | | 100 |
| Chemical resistance | | 3 | 3 | 3 | 3 | 3 | 3 | 3 |
| Weight decrease ratios (%) | 200° C. | 0.12 | 0.11 | 0.13 | 0.12 | 0.18 | 0.17 | 0.17 |
|  | 250° C. | 0.80 | 0.81 | 0.79 | 0.79 | 1.84 | 1.82 | 1.84 |
|  | 300 degrees | 2.33 | 2.31 | 2.31 | 2.30 | 7.41 | 7.39 | 7.40 |
| Flex resistance | Cracking | 2 | 2 | 1 | 1 | 1 | 1 | 1 |
|  | Whitening | — | — | 1 | 3 | 1 | 1 | 3 |
| Transparency (cloudiness value) | | 0.5 | 0.6 | 2.4 | 0.5 | 0.5 | 0.5 | 0.4 |
| Bleed property | | 1 | 1 | 1 | 1 | 2 | 2 | 2 |

*In production example 23, the latex aggregated at the time of the emulsion polymerization thereof; thus, no resin powder was yielded and no film was able to be formed.

INDUSTRIAL APPLICABILITY

A film laminate product obtained from the methacrylic resin composition of the present invention can be used as a paint alternate product such as a car interior member or a car exterior member, a building material such as a window frame, bath room equipment, wall paper or a floor material, an article of dairy use, a housing for furniture or electrical equipment, a housing for an OA device such as a facsimile, a component of an electrical or electronic device, or the like. Molded products can be used, as a formed product, for an illuminating lens, a car head light, an optical lens, an optical fiber, an optical disc, a light guiding plate for liquid crystal, a film for liquid crystal, a medical article for which sterilizing treatment is necessary, a cooking container for a microwave oven, a housing for a household electric appliance, a toy, a recreation article, or the like.

The invention claimed is:

1. A methacrylic resin composition (C) comprising an acrylic graft copolymer (A) containing an acrylic ester rubbery polymer (A-a) and a methacrylic polymer (B) containing 80% or more by weight of a methacrylic ester, and satisfying the following:
   (1) the content by percentage of the acrylic ester rubbery polymer (A-a) is from 5 to 45% or less by weight,
   (2) the average particle diameter d of the acrylic ester rubbery polymer (A-a) is from 50 to 200 nm,
   (3) the relationship between the average particle diameter d (nm) of the acrylic ester rubbery polymer (A-a) and the amount w (% by weight) of a crosslinking agent used for the acrylic ester rubbery polymer (A-a) satisfies the following formula:

$$0.02d \leq w \leq 0.05d,$$

(4) the graft ratio of the acrylic graft copolymer (A) is from 30 to 250%,
   (5) the reduced viscosity of a fraction of the methacrylic resin composition (C) soluble in methyl ethyl ketone is from 0.2 to 0.8 dl/g, and
   (6) an ultraviolet absorber represented by the following general formula (1) is copolymerized, in an amount of 0.01 to 30 parts by weight for 100 parts by weight of the acrylic graft copolymer (A), with the acrylic graft copolymer (A):

general formula (1)

[formula 1]

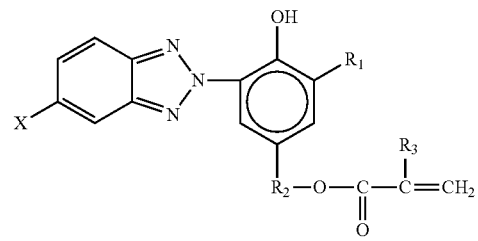

wherein X is H or a halogen, $R_1$ is H, methyl or a t-alkyl group which has 4 to 6 carbon atoms, $R_2$ is an alkylene group which is in a linear or branched chain form and has 2 to 10 carbon atoms, and $R_3$ is H or methyl.

2. The methacrylic resin composition according to claim 1, wherein the methacrylic polymer (B) is a methacrylic polymer obtained by copolymerizing a monomer mixture which contains a methacrylic ester and an acrylic ester at the ratio by weight of the former to the latter of from 90/10 to 100/0, and contains the ultraviolet absorber represented by the general formula (1) in an amount of 0.01 to 30 parts by weight for 100 parts by weight of the methacrylic ester.

3. The methacrylic resin composition according to claim 1, wherein the average particle diameter of the acrylic graft copolymer (A) is larger than the average particle diameter d of the acrylic ester rubbery polymer (A-a), and is more than 100 nm and 400 nm or less.

4. A film obtained by forming the methacrylic resin composition according to claim 1 into a shape.

5. A laminate product, comprising the film according to claim 4.

6. The laminate product according to claim 5, which is produced by injection molding.

7. The methacrylic resin composition according to claim 1, wherein (6) the ultraviolet absorber represented by general formula (1) is copolymerized with both of the acrylic ester rubbery polymer (A-a) and a monomer mixture (A-b).

8. The methacrylic resin composition according to claim 1, wherein the acrylic ester rubbery polymer (A-a) is obtained by copolymerizing a monomer mixture which contains 60 to 100% by weight of an acrylic ester, 0 to 40% by weight of a vinyl monomer and a crosslinking agent.

9. The methacrylic resin composition according to claim 7, wherein the monomer mixture (A-b) comprises a methacrylic ester.

10. The methacrylic resin composition according to claim 1, wherein the graft ratio of the acrylic graft copolymer (A) is from 50 to 230%.

11. The methacrylic resin composition according to claim 1, wherein the graft ratio of the acrylic graft copolymer (A) is from 70 to 220%.

* * * * *